(12) United States Patent
Hritz (10) Patent No.: US 10,208,743 B2
(45) Date of Patent: Feb. 19, 2019

(54) PISTON CYLINDER ARRANGEMENT FOR AN OIL FREE COMPRESSOR HAVING COOLING PASSAGEWAYS AND METHOD OF COOLING WRIST PIN BEARING SURFACE

(71) Applicant: Westinghouse Air Brake Technologies Corporation, Wilmerding, PA (US)

(72) Inventor: Jeffrey Hritz, Jefferson Hills, PA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 188 days.

(21) Appl. No.: 15/288,295

(22) Filed: Oct. 7, 2016

(65) Prior Publication Data

US 2018/0100493 A1 Apr. 12, 2018

(51) Int. Cl.
| F04B 27/04 | (2006.01) |
| F16J 1/16 | (2006.01) |
| F04B 39/06 | (2006.01) |
| F04B 39/00 | (2006.01) |
| F04B 53/14 | (2006.01) |
| F04B 27/053 | (2006.01) |
| F04B 35/01 | (2006.01) |

(52) U.S. Cl.
CPC ............ *F04B 39/066* (2013.01); *F04B 27/04* (2013.01); *F04B 27/0409* (2013.01); *F04B 27/0442* (2013.01); *F04B 27/053* (2013.01); *F04B 35/01* (2013.01); *F04B 39/0005* (2013.01); *F04B 39/0094* (2013.01); *F04B 53/14* (2013.01); *F16J 1/16* (2013.01)

(58) Field of Classification Search
CPC .... F04B 39/066; F04B 27/04; F04B 39/0005; F04B 53/14; F16J 1/16
USPC .......................................................... 74/595
See application file for complete search history.

(56) References Cited

U.S. PATENT DOCUMENTS

| 1,959,279 A | 5/1934 | Stearns |
| 2,108,532 A | 2/1938 | Frelin |
| 2,446,348 A | 8/1948 | Webster |
| 2,566,080 A | 8/1951 | Davids |
| 2,742,883 A | 4/1956 | Smith |
| 2,823,085 A | 2/1958 | Keylwert |
| 4,015,915 A | 4/1977 | Lardman |
| 4,269,083 A | 5/1981 | Wandel |
| 4,364,307 A | 12/1982 | Paro |
| 4,550,647 A | 11/1985 | Coulin |
| 5,063,831 A | 11/1991 | Byard |
| 5,072,654 A | 12/1991 | MacGregor |
| 6,571,684 B1 | 6/2003 | Nov et al. |
| 2004/0089099 A1* | 5/2004 | Gaiser ........................ F16J 1/16 74/595 |
| 2010/0221128 A1* | 9/2010 | Mellar ..................... F04B 39/06 417/410.1 |
| 2015/0322933 A1 | 11/2015 | Hritz |

* cited by examiner

*Primary Examiner* — F Daniel Lopez
*Assistant Examiner* — Daniel S Collins
(74) *Attorney, Agent, or Firm* — The Webb Law Firm (57) ABSTRACT

A piston cylinder arrangement for an air compressor including a cylinder, a connecting rod having a wrist pin receiving end, a wrist pin provided in the wrist pin receiving end of the connecting rod, and a piston provided on the connecting rod via the wrist pin and positioned within the cylinder. At least one passageway may be defined in the wrist pin to permit air to flow into the wrist pin from the cylinder.

20 Claims, 4 Drawing Sheets

PISTON CYLINDER ARRANGEMENT FOR AN OIL FREE COMPRESSOR HAVING COOLING PASSAGEWAYS AND METHOD OF COOLING WRIST PIN BEARING SURFACE

BACKGROUND OF THE INVENTION

Field of the Invention

The present disclosure is generally directed to a piston cylinder arrangement for a compressor and, more particularly, to a piston cylinder arrangement for an oil free compressor and a method of cooling the piston cylinder arrangement.

Description of Related Art

By nature of its design, a reciprocating compressor transfers rotary motion of a crankshaft to reciprocating motion of one or more pistons through a matched number of connecting rods. The compressor uses a pin, commonly called a wrist pin, to connect the piston to the connecting rod. The connection between the wrist pin, piston, and connecting rod must include a bearing surface capable of handling the oscillating motion between the parts and the loads generated by the inertial and compression forces of the dynamic components of the compressor. There are many acceptable bearing types and mounting methods to create a reliable bearing surface. However, an important factor in the operation of the bearing surface is to keep the operating temperatures within a proper range for the bearing materials and lubrication.

In an oil flooded compressor, cooling of the bearing surface is accomplished by feeding oil to the bearing through a lubrication system that may use pressurized oil or an oil splash. The oil passes through or around the bearing surface to lubricate the bearing to carry generated frictional heat away from the joint and bearing surface. In an oil free compressor, all of the bearing surfaces are plain bearings that do not require lubrication or sealed roller bearing containing grease. This type of compressor requires cooling methods that do not rely on the flow of oil throughout the moving components. Typical methods of cooling the bearing surfaces in an oil free compressor include moving pressurized or free air across the bearing surface to cool the wrist pin bearing.

As examples, U.S. Pat. No. 4,550,647 to Coulin, herein incorporated by reference in its entirety, discloses a piston pin that connects a piston to a connecting rod in an internal combustion engine. The piston pin is provided with a plurality of passages that permit oil to pass through the piston pin to lubricate an inner cavity of the piston. U.S. Pat. No. 2,742,883 to Smith, herein incorporated by reference in its entirety, discloses an oil cooled piston structure including a piston connected to a connecting rod via a piston pin. An oil passage defined in the connecting rod supplies oil to the piston pin. Holes defined in the piston pin supply oil from the piston pin to the piston head via a plurality of passageways. A second plurality of passageways permit oil that is provided between the piston and the cylinder to pass back into the piston.

SUMMARY OF THE INVENTION

In view of the foregoing, there is a current need for a piston cylinder arrangement for an oil free compressor that provides an adequate flow of pressurized air or free air through the wrist pin and/or piston to cool the wrist pin bearing and wrist pin bearing surface.

In one aspect, a piston cylinder arrangement for an air compressor including a cylinder, a connecting rod having a wrist pin receiving end, a wrist pin provided in the wrist pin receiving end of the connecting rod, and a piston provided on the connecting rod via the wrist pin and positioned within the cylinder. At least one passageway may be defined in the wrist pin to permit air to flow into the wrist pin from the cylinder.

The at least one passageway may permit a bi-directional flow of the air into and out of the wrist pin. The at least one passageway defined in the wrist pin may include two inlet passageways. One inlet passageway may be provided on a first side of the wrist pin receiving end of the connecting rod, and one inlet passageway may be provided on a second side of the wrist pin receiving end of the connecting rod. At least one outlet passageway may be defined in the piston to permit the air to flow out of the wrist pin through the piston. The at least one outlet passageway defined in the piston may be provided beneath the wrist pin. The at least one outlet passageway defined in the piston may be inclined relative to the wrist pin. The at least one passageway defined in the wrist pin may include an inlet passageway and an outlet passageway. The outlet passageway may be provided in an upper surface of the wrist pin, and the inlet passageway may be provided in a lower surface of the wrist pin. The wrist pin may be held within two opposing recesses defined by the piston. A wrist pin bearing may be provided in the wrist pin receiving end of the connecting rod. The wrist pin bearing may be positioned between the wrist pin and the connecting rod.

In another aspect, an air compressor for a rail vehicle may include a compressor housing, a crankshaft assembly supported by the compressor housing, and at least one piston cylinder supported in the compressor housing. The at least one piston cylinder may include a cylinder, a connecting rod having a wrist pin receiving end, the connecting rod linked to the crankshaft assembly, a wrist pin provided in the wrist pin receiving end of the connecting rod, and a piston provided on the connecting rod via the wrist pin and provided within the cylinder. At least one passageway may be defined in the wrist pin to permit air to flow into the wrist pin from the cylinder.

The at least one passageway may permit a bi-directional flow of the air into and out of the wrist pin. The at least one passageway defined in the wrist pin may include two inlet passageways. One inlet passageway may be provided on a first side of the wrist pin receiving end of the connecting rod, and one inlet passageway may be provided on a second side of the wrist pin receiving end of the connecting rod. At least one outlet passageway may be defined in the piston to permit the air to flow out of the wrist pin through the piston. The at least one outlet passageway defined in the piston may be provided beneath the wrist pin. The at least one outlet passageway defined in the piston may be inclined relative to the wrist pin. The at least one passageway defined in the wrist pin may include an inlet passageway and an outlet passageway. The outlet passageway may be provided in an upper surface of the wrist pin, and the inlet passageway may be provided in a lower surface of the wrist pin. The wrist pin may be held within two opposing recesses defined by the piston. A wrist pin bearing may be provided in the wrist pin receiving end of the connecting rod. The wrist pin bearing may be positioned between the wrist pin and the connecting rod.

In another aspect, a method of cooling a wrist pin in a piston cylinder of an air compressor may include directing air from a compressor housing of the air compressor into the piston cylinder; directing the air from the piston cylinder into the wrist pin provided on a connecting rod in the piston cylinder; directing the air through the wrist pin; and directing the air back into the compressor housing through the wrist pin. The method may further include directing the air out of the wrist pin through a piston provided on the wrist pin.

These and other features and characteristics of the wrist pin and compressor, as well as the methods of operation and functions of the related elements of the compressor, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only, and are not included as a definition of the limits of the disclosure. As used in the specification and claims, the singular form of "a", "an", and "the" include plural referents unless the context clearly dictates otherwise.

DESCRIPTION OF THE DISCLOSURE

For purposes of the description hereinafter, the terms "upper", "lower", "right", "left", "vertical", "horizontal", "top", "bottom", "lateral", "longitudinal", and derivatives thereof, shall relate to the invention as it is oriented in the figures. However, it is to be understood that the invention may assume alternative variations and step sequences, except where expressly specified to the contrary. It is also to be understood that the specific systems and processes illustrated in the attached drawings, and described in the following specification, are simply exemplary aspects of the disclosure. Hence, specific dimensions and other physical characteristics related to the aspects disclosed herein are not to be considered as limiting.

Referring to the drawings in which like reference numerals refer to like parts throughout the several views thereof, the present disclosure is generally directed to a piston cylinder arrangement of a compressor and, more particularly, to a piston cylinder arrangement of an oil free compressor having cooling passageways to direct air through a wrist pin and a piston to cool a wrist pin bearing and wrist pin bearing surface.

Figure 1:
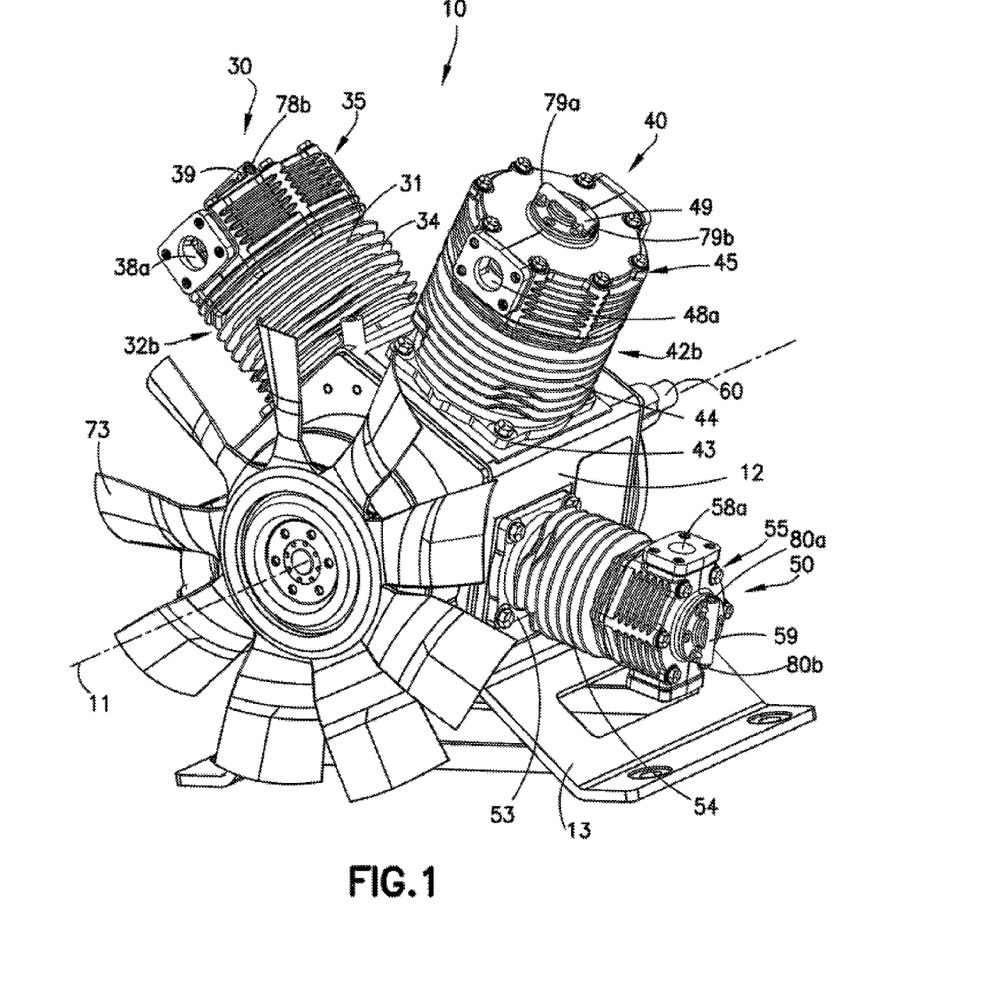
FIG. 1 is a perspective view of an oil free compressor according to the present disclosure.
Figure 2:
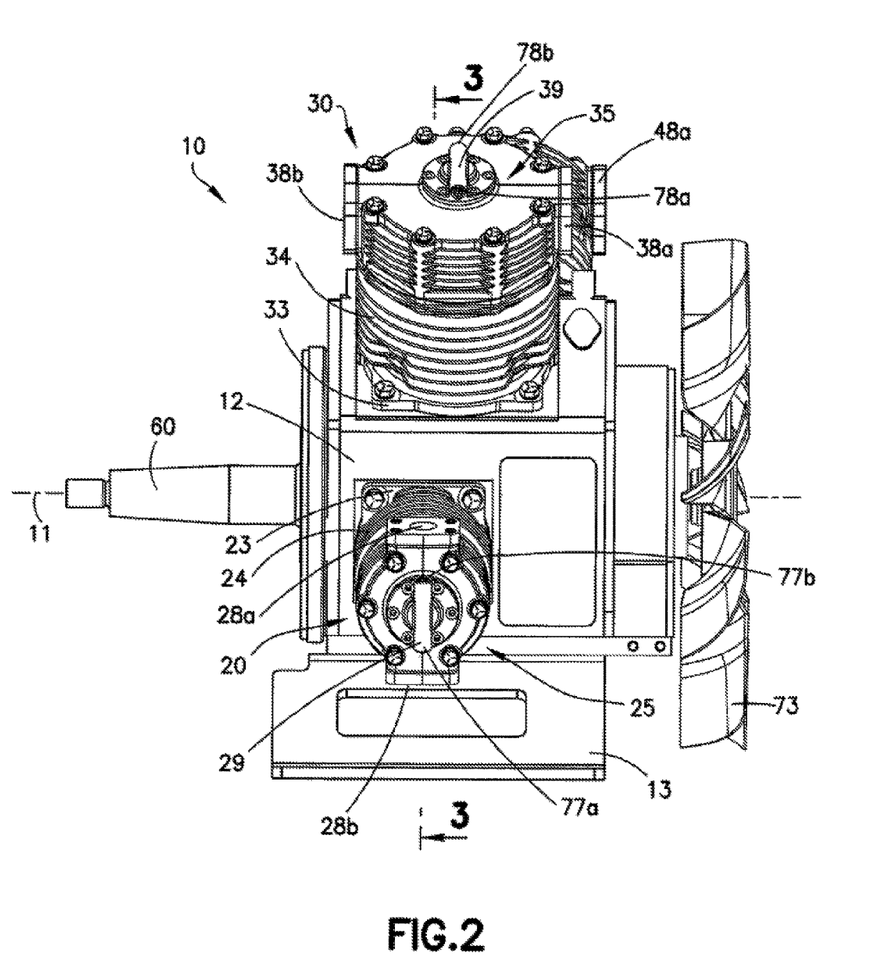
FIG. 2 is a side view of the oil free compressor shown in FIG. 1.
Figure 3:
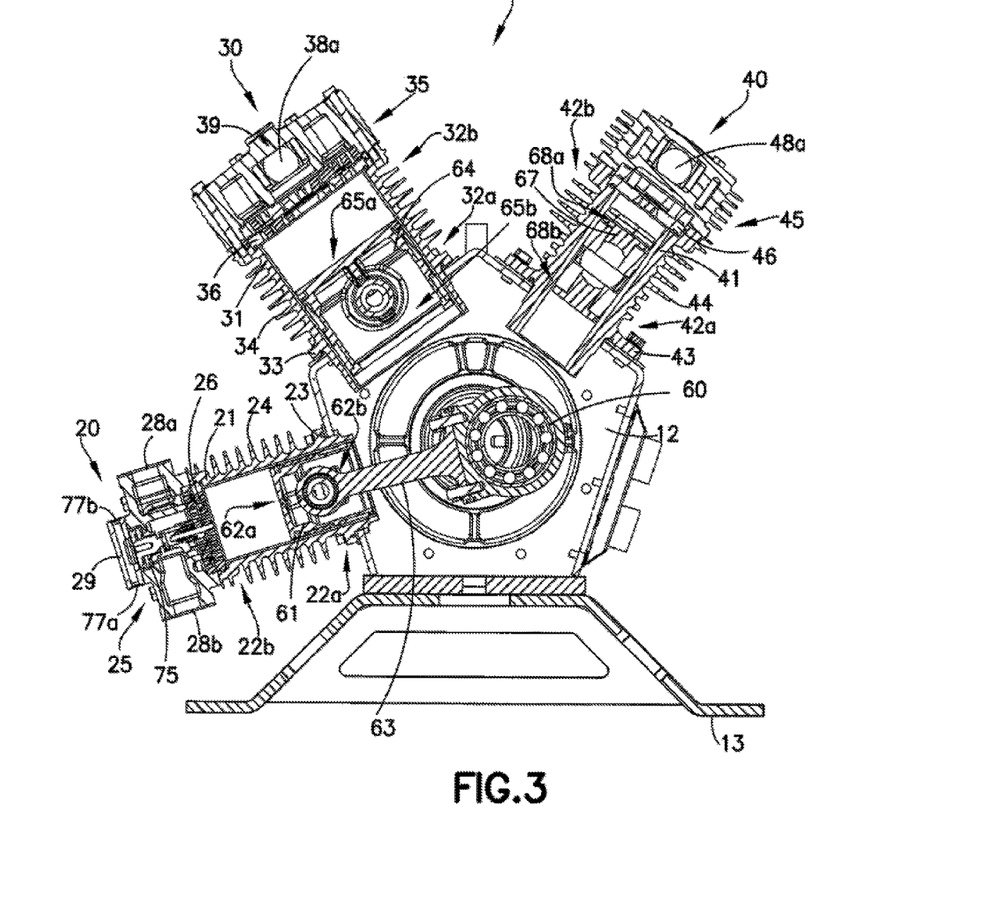
FIG. 3 is a cross-sectional view of the oil free compressor shown in FIG. 1 along line 3-3.

Referring to FIGS. 1-3, an air compressor 10 according to one aspect is shown. As shown, the air compressor 10 is a multi-cylinder air compressor 10 including at least a first piston cylinder 20, a second piston cylinder 30, a third piston cylinder 40, and a fourth piston cylinder 50. In one aspect, the air compressor 10 may be an oil-free air compressor. In another aspect, the air compressor 10 may be one such as the air compressor disclosed in United States Patent Application Publication No. 2015/0322933, the disclosure of which is hereby incorporated by reference in its entirety. Although one aspect of an air compressor 10 is shown in FIGS. 1-3, it is to be understood that this disclosure is applicable to any type of compressor, including oil and oil-free configurations. The first piston cylinder 20, the second piston cylinder 30, the third piston cylinder 40, and the fourth piston cylinder 50 may be supported by a compressor housing 12 or crankcase and may each be driven by a crankshaft assembly 60 disposed within the compressor housing 12 and rotationally supported by the compressor housing 12. The foregoing components of the air compressor 10 are described in detail herein. The air compressor 10 may have a pentagonal-shaped cross-section. A support member 13 may be fastened to a bottom surface of the air compressor 10. The support member 13 may be used to mount the air compressor 10 on a locomotive or rail vehicle. The air compressor 10 may further include a cooling fan 73.

The first piston cylinder 20, the second piston cylinder 30, the third piston cylinder 40, and the fourth piston cylinder 50 are of substantially similar construction with the first piston cylinder 20 operating as the first cylinder, the second piston cylinder 30 operating as the second cylinder, the third piston cylinder 40 operating as the third cylinder, and the fourth piston cylinder 50 operating as the fourth cylinder in the multi-cylinder air compressor 10. In one aspect of the disclosure, the first piston cylinder 20 and the fourth piston cylinder 50 may be high pressure piston cylinders. In this same aspect, the second piston cylinder 30 and the third piston cylinder 40 may be low pressure piston cylinders. The first piston cylinder 20 and the fourth piston cylinder 50 are generally smaller than, and generally have a smaller diameter than the second piston cylinder 30 and the third piston cylinder 40.

In one aspect, the first piston cylinder 20, the second piston cylinder 30, the third piston cylinder 40, and the fourth piston cylinder 50 are radially configured about a longitudinal axis 11 of the air compressor 10. The piston cylinders 20, 30, 40, 50 interface with an outer circumference of the air compressor 10. In one aspect, the piston cylinders 20, 30, 40, 50 may be positioned in an X-shaped configuration around the outer circumference of the compressor housing. The first piston cylinder 20 and the fourth piston cylinder 50 may be configured as first and second lower legs of the X-shaped configuration. The second piston cylinder 30 and the third piston cylinder 40 may be configured as first and second upper legs of the X-shaped configuration. In one aspect, the second piston cylinder 30 and the third piston cylinder 40 may be positioned on the compressor housing 12 between the first piston cylinder 20 and the fourth piston cylinder 50.

As shown in FIGS. 1-3, the first piston cylinder 20 includes a cylindrical housing 21 that has a first end 22a adapted to be inserted into a corresponding opening in the compressor housing 12, as described herein, and a second end 22b. The cylindrical housing 21 is formed with a flange 23 located proximal of the first end 22a for interfacing with the exterior of the compressor housing 12. Heat-dissipating fins 24 may be provided about the cylindrical housing 21, and the cylindrical housing 21 may be formed of any suitable material providing sufficient strength and heat-dissipating characteristics such as aluminum.

A cylinder head 25 is secured to the second end 22b of the cylindrical housing 21. The cylinder head 25 secures a valve assembly 26 on the second end 22b of the cylindrical housing 21 via mechanical fasteners. The cylinder head 25 also houses an unloader cap 29 positioned above the valve assembly 26. The unloader cap 29 houses an unloader piston 75 that is pneumatically operated by air piloted through the unloader cap 29 mechanically fastened to the top of the cylinder head 25. A lubrication free seal between the unloader piston 75 and the unloader cap 29 separates the pressurized air within the inlet portion of the cylinder head 25 from the pressurized air (pilot air) within the unloader system. The unloader piston 75 functions to hold the inlet side of the valve assembly 26 open when air pressure is applied to pilot ports 77a, 77b of the unloader cap 29. During this period of operation, the compressor 10 can rotate without delivering compressed air to the compressor discharge. The cylinder head 25 includes a first air channel 28a and a second air channel 28b. The cylinder head 25 may be formed of any suitable material providing sufficient strength and heat transfer characteristics such as aluminum.

As noted previously, the second piston cylinder 30 has a substantially similar construction as the rest of the piston cylinders, as now described hereinafter. The second piston cylinder 30 includes a cylindrical housing 31 that has a first end 32a adapted to be inserted into a corresponding opening in the compressor housing 12, as described herein, and a second end 32b. The cylindrical housing 31 is formed with a flange 33 located proximal of the first end 32a for interfacing with the exterior of the compressor housing 12. Heat-dissipating fins 34 may be provided about the cylindrical housing 31, and the cylindrical housing 31 may be formed of any suitable material providing sufficient strength and heat-dissipating characteristics such as aluminum.

A cylinder head 35 is secured to the second end 32b of the cylindrical housing 31. The cylinder head 35 secures a valve assembly 36 on the second end 32b of the cylindrical housing 31 via mechanical fasteners. The cylinder head 35 also houses an unloader cap 39 positioned above the valve assembly 36. The unloader cap 39 houses an unloader piston that is pneumatically operated by air piloted through the unloader cap 39 mechanically fastened to the top of the cylinder head 35. A lubrication free seal between the unloader piston and the unloader cap 39 separates the pressurized air within the inlet portion of the cylinder head 35 from the pressurized air (pilot air) within the unloader system. The unloader piston functions to hold the inlet side of the valve assembly 36 open when air pressure is applied to pilot ports 78a, 78b of the unloader cap 39. During this period of operation, the compressor 10 can rotate without delivering compressed air to the compressor discharge. The cylinder head 35 includes a first air channel 38a and a second air channel 38b. The cylinder head 35 may be formed of any suitable material providing sufficient strength and heat transfer characteristics such as aluminum.

As noted previously, the third piston cylinder 40 has a substantially similar construction as the rest of the piston cylinders, as now described hereinafter. The third piston cylinder 40 includes a cylindrical housing 41 that has a first end 42a adapted to be inserted into a corresponding opening in the compressor housing 12, as described herein, and a second end 42b. The cylindrical housing 41 is formed with a flange 43 located proximal of the first end 42a for interfacing with the exterior of the compressor housing 12. Heat-dissipating fins 44 may be provided about the cylindrical housing 41, and the cylindrical housing 41 may be formed of any suitable material providing sufficient strength and heat-dissipating characteristics such as aluminum.

A cylinder head 45 is secured to the second end 42b of the cylindrical housing 41. The cylinder head 45 secures a valve assembly 46 on the second end 42b of the cylindrical housing 41 via mechanical fasteners. The cylinder head 45 also houses an unloader cap 49 positioned above the valve assembly 46. The unloader cap 49 houses an unloader piston that is pneumatically operated by air piloted through the unloader cap 49 mechanically fastened to the top of the cylinder head 49. A lubrication free seal between the unloader piston and unloader cap 49 separates the pressurized air within the inlet portion of the cylinder head 45 from the pressurized air (pilot air) within the unloader system. The unloader piston functions to hold the inlet side of the valve assembly 46 open when air pressure is applied to pilot ports 79a, 79b of the unloader cap 49. During this period of operation, the compressor 10 can rotate without delivering compressed air to the compressor discharge. The cylinder head 45 includes a first air channel 48a and a second air channel 48b. The cylinder head 45 may be formed of any suitable material providing sufficient strength and heat transfer characteristics such as aluminum.

As noted previously, the fourth piston cylinder 50 has a substantially similar construction as the rest of the piston cylinders, as now described hereinafter. The fourth piston cylinder 50 includes a cylindrical housing 51 that has a first end 52a adapted to be inserted into a corresponding opening in the compressor housing 12, as described herein, and a second end 52b. The cylindrical housing 51 is formed with a flange 53 located proximal of the first end 52a for interfacing with the exterior of the compressor housing 12. Heat-dissipating fins 54 may be provided about the cylindrical housing 51, and the cylindrical housing 51 may be formed of any suitable material providing sufficient strength and heat-dissipating characteristics such as aluminum.

A cylinder head 55 is secured to the second end 52b of the cylindrical housing 51. The cylinder head 55 secures a valve assembly 56 on the second end 52b of the cylindrical housing 51 via mechanical fasteners. The cylinder head 55 also houses an unloader cap 59 positioned above the valve assembly 56. The unloader cap 59 houses an unloader piston that is pneumatically operated by air piloted through the unloader cap 59 mechanically fastened to the top of the cylinder head 55. A lubrication free seal between the unloader piston and the unloader cap 59 separates the pressurized air within the inlet portion of the cylinder head 55 from the pressurized air (pilot air) within the unloader system. The unloader piston functions to hold the inlet side of the valve assembly 56 open when air pressure is applied to pilot ports 80a, 80b of the unloader cap 59. During this period of operation, the compressor 10 can rotate without delivering compressed air to the compressor discharge. The cylinder head 55 includes a first air channel 58a and a second air channel. The cylinder head 55 may be formed of any suitable material providing sufficient strength and heat transfer characteristics such as aluminum.

Referring to FIG. 3, the first piston cylinder 20 further includes a first piston 61 that is reciprocally operable within the cylindrical housing 21. The piston 61 includes a first end 62a and a second end 62b, and is made of any suitable material providing sufficient strength and heat transfer characteristics such as aluminum. The piston 61 is operatively connected to the crankshaft assembly 60 via a connecting rod 63. In operation, the piston 61 operates in a reciprocating movement which is generated via rotation of the crankshaft assembly 60. Air is drawn into the cylindrical housing 21 of the first piston cylinder 20 via one of the air channels 28a, 28b as a result of the downward movement of the piston 61. A valve assembly 26 includes a portion that is opened during the downward movement of the piston 61, drawing air into the cylindrical housing 21, and closes during the upward movement. Further, the valve assembly has another portion that closes during the downward movement of the piston 61 and opens during the upward movement of the piston 61, whereby air in the cylindrical housing 21 is compressed and is guided out of the cylindrical housing 21 via one of the air channels 28a, 28b.

The second piston cylinder 30 further includes a second piston 64 that is reciprocally operable within the cylindrical housing 31. The piston 61 includes a first end 65a and a second end 65b, and is made of any suitable material providing sufficient strength and heat transfer characteristics such as aluminum. The piston 64 is operatively connected to the crankshaft assembly 60 via a connecting rod (not shown). In operation, the piston 64 operates in a reciprocating movement which is generated via rotation of the crankshaft assembly 60. Air is drawn into the cylindrical housing 31 of the second piston cylinder 30 via one of the air channels 38a, 38b as a result of the downward movement of the piston 64. A valve assembly 36 includes a portion that is opened during the downward movement of the piston 64, drawing air into the cylindrical housing 31, and closes during the upward movement. Further, the valve assembly has another portion that closes during the downward movement of the piston 64 and opens during the upward movement of the piston 64, whereby air in the cylindrical housing 31 is compressed and is guided out of the cylindrical housing 31 via one of the air channels 38a, 38b.

The third piston cylinder 40 further includes a third piston 67 that is reciprocally operable within the cylindrical housing 41. The piston 67 includes a first end 68a and a second end 68b, and is made of any suitable material providing sufficient strength and heat transfer characteristics such as aluminum. The piston 67 is operatively connected to the crankshaft assembly 60 via a connecting rod (not shown). In operation, the piston 67 operates in a reciprocating movement which is generated via rotation of the crankshaft assembly 60. Air is drawn into the cylindrical housing 41 of the third piston cylinder 40 via one of the air channels 48a, 48b as a result of the downward movement of the piston 67. A valve assembly 46 includes a portion that is opened during the downward movement of the piston 67, drawing air into the cylindrical housing 41, and closes during the upward movement. Further, the valve assembly has another portion that closes during the downward movement of the piston 67 and opens during the upward movement of the piston 67, whereby air in the cylindrical housing 41 is compressed and is guided out of the cylindrical housing 41 via one of the air channels 48a, 48b. The fourth piston cylinder 50 further includes a similar configuration (not shown) as the first piston cylinder 20, the second piston cylinder 30, and the third piston cylinder 40.

Figure 4:
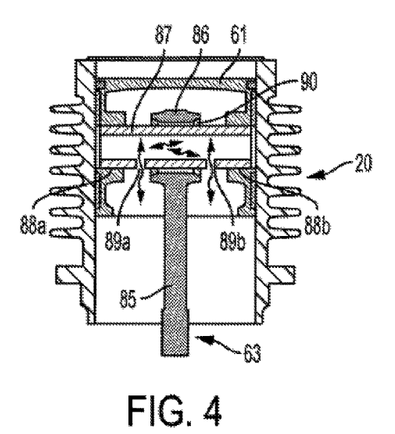
FIG. 4 is a cross-sectional view of one aspect of a piston cylinder of the oil free compressor of FIG. 1 including a connecting rod, a piston, and a wrist pin defining cooling passageways.
Figure 5:
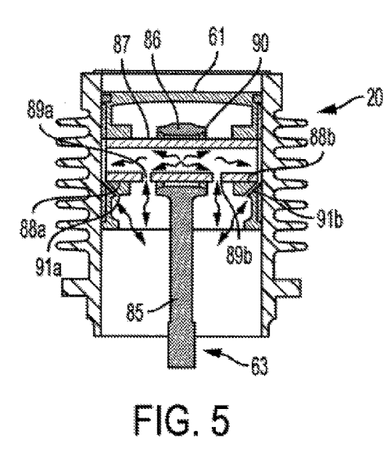
FIG. 5 is a cross-sectional view of another aspect of a piston cylinder of the oil free compressor of FIG. 1 including a connecting rod, piston defining cooling passageways, and a wrist pin defining cooling passageways.
Figure 6:
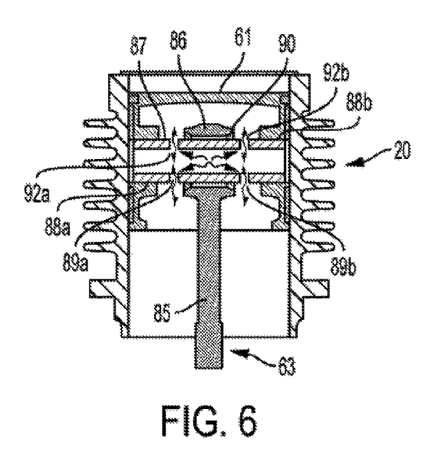
FIG. 6 is a cross-sectional view of another aspect of a piston cylinder of the oil free compressor of FIG. 1 including a connecting rod, a piston, and a wrist pin defining cooling passageways.

With reference to FIGS. 4-6, the first piston 61 and the connecting rod 63 of the first piston cylinder 20 are described in greater detail. Although the description is provided in relation to the first piston cylinder 20, it is to be understood that the remaining piston cylinders 30, 40, 50 are configured similarly to the first piston cylinder 20. The connecting rod 63 may include a rod member 85, a crank pin receiving end (not shown), and a wrist pin receiving end 86. The wrist pin receiving end 86 may define an aperture to receive a wrist pin 87 therein. The wrist pin 87 may be a substantially cylindrical, hollow member that connects the connecting rod 63 to the piston 61. The wrist pin 87 may be received within opposing recesses 88a, 88b defined in an inner surface of the piston 61. It is contemplated, however, that the wrist pin 87 may be connected to the piston 61 using several different methods. The wrist pin 87 may be insulated from the piston 61 or have a direct conducting contact with the piston 61. As the connecting rod 63 reciprocates within the first piston cylinder 20, the piston 61 is moved in an up-and-down direction within the first piston cylinder 20.

In one aspect of the wrist pin 87 shown in FIG. 4, at least two passageways 89a, 89b may be defined in a lower portion of the wrist pin 87. Although two passageways 89a, 89b are shown in FIG. 4, it is also contemplated that fewer or more passageways may be defined in the wrist pin 87 as desired. The passageways 89a, 89b may be holes, slots, or any other types of passageways that are drilled into the wrist pin 87. In one aspect, one passageway 89a may be provided on one side of the connecting rod 63 and another passageway 89b may be provided on an opposing side of the connecting rod 63. The passageways 89a, 89b act as ports to allow air to freely flow through the wrist pin 87. This flow of air provides cooling for the wrist pin bearing 90 by allowing hot air to escape through one of the passageways 89a, 89b and cooler air to flow through the wrist pin 87 through another passageway 89a, 89b. The passageways 89a, 89b may be oriented in the wrist pin 87 such that the passageways 89a, 89b face the crankcase of the compressor 10 when assembled to the piston 61 and the connecting rod 63. In one aspect, the wrist pin 87 may be free to oscillate in the connecting rod 63 and may be fixed in the piston 61. This same type of arrangement may also be achieved by fixing the wrist pin 87 in the connecting rod 63 or allowing the wrist pin 87 to freely float in both the piston 61 and the connecting rod 63. In one aspect, a wrist pin bearing 90 may be used to transfer the motion and loading between the wrist pin 87 and the connecting rod 63. The wrist pin bearing 90 may be a grease lubricated roller bearing sealed by integrated or external seals.

As the piston 61 moves in the first piston cylinder 20, air is allowed to move into and out of the hollow center of the wrist pin 87. The air that moves through the wrist pin 87 is directed from the compressor crankcase. The crankcase of an oil free compressor 10 must be cooled using a positive flow system. Therefore, the air that moves through the wrist pin 87 is cool air that is transferred into the crankcase. The air from the crankcase is directed through the first piston cylinder 20 and into the wrist pin 87. The additional surface area created by the hollow wrist pin 87 and passageways 89a, 89b result in improved cooling of the wrist pin 87 and the wrist pin bearing 90 as a result of increased convection surface area. Any hot air held within the hollow wrist pin 8'7 may be pushed and directed out of one of the passageways 89a, 89b of the wrist pin 87 by the cooling air that is directed into the wrist pin 87. The hot air may be transferred to the walls of the first piston cylinder 20 and away using forced convection across the first piston cylinder 20 or back into the crankcase and away to atmosphere through the crankcase if forced ventilation is utilized in the crankcase. The heated air may return to the crankcase passing by a piston wear ring (not shown) between the first piston cylinder 20 bore and the piston 61, which are not pressure sealing. Air flow may be maintained through the wrist pill 87 by forced ventilation in the crankcase. However, cooling may still be increased via conduction to the first piston cylinder 20 bore.

In another aspect shown in FIG. 5, piston 61 may also include passageways 91a, 91b that permits cooling air to enter and/or exit the wrist pin 87. Similar to the passageways 89a, 89b in the wrist pin 87, the passageways 91a, 91b in the piston 61 may be drilled into the piston 61. However, it is also contemplated that other methods may be used to define the passageways 91a, 91b in the piston 61. The passageways 91a, 91b may be drilled into the bottom of the recesses 88a, 88b to create a passageway between the inner cavity of the wrist pin 87 and the first piston cylinder 20. In one aspect, one passageway 91a may be provided on one side of the connecting rod 63 and another passageway 91b may be provided on an opposing side of the connecting rod 63. The passageways 91a, 91b may be drilled into the piston 61 at an angle to assist in directing any returning hot air back towards the crankcase. In one aspect, the passageways 91a, 91b may be inclined downwardly and inwardly towards connecting rod 63. A complete air circuit may be created from the crankcase through the passageways 89a, 89b defined in the wrist pin 87, through the inner cavity of the wrist pin 87, through the passageways 91a, 91b defined in the piston 61, and back to the crankcase. The piston 61 may also include a heat conduction path wrist pin bearing 90, through the wrist pin 87 to the piston 61, and then through the cylinder walls. Using this heat conduction path, the heated air can escape through the first piston cylinder 20 walls. The conduction path may be provided by any number of means, including non-insulating piston rings or conducting rings (not shown) or ring gaps that allow a free path to the first piston cylinder 20 walls.

In another aspect shown in FIG. 6, a plurality of passageways 92a, 92b may be defined in an upper portion of the wrist pin 87. Therefore, along with the passageways 89a, 89b defined in the lower portion of the wrist pin 87, passageways 92a, 92b may extend fully through the wrist pin 87. Although two passageways 92a, 92b are shown in FIG. 6, it is also contemplated that fewer or more passageways may be defined in the wrist pin 87 as desired. The passageways 89a, 89b, 92a, 92b allow cooling air to travel through the wrist pin 87 independent of whether the wrist pin 87 is insulated from the piston 61. These passageways 89a, 89b, 92a, 92b may also be beneficial if a piston crown is insulated from the heat of compression that occurs in the cylinder above the piston 61. In another aspect, the first piston cylinder 20 may include all of the passageways 89a, 89b, 91a, 91b, 92a, 92b to create an even greater cooling effect for the wrist pin 87 and the wrist pin bearing 90.

With reference to FIGS. 4-6, a method of cooling the wrist pin 87, the wrist pin bearing 90, and the piston 61 is described. In one aspect, cooling air may be pulled from the compressor housing 12 into the piston cylinder 20. The cooling air is directed into the wrist pin 87 via the passageways 89a, 89b defined in the wrist pin 87. The cooling air is free to move through the wrist pin 87 to cool the wrist pin 87 and wrist pin bearing 90. The cooling air may be directed out of the wrist pin 87 via the upper passageways 92a, 92b defined in the wrist pin 87. The cooling air may pass over the wrist pin bearing 90 and the piston 61 to cool both of these components. The cooling air may also be directed out of the wrist pin 87 and into the piston 61 to cool the piston 61. The cooling air may pass out of two opposing, open ends of the wrist pin 87 and through the passageways 91a, 91b defined in the piston 61. The piston 61 may be cooled as the cooling air is directed through the passageways 91a, 91b. It is to be understood that each passageway 89a, 89b, 91a, 91b, 92a, 92b may be configured for bi-directional flow of air therethrough.

While aspects of a radially configured oil-free compressor and wrist pins with cooling passageways are shown in the accompanying figures and described hereinabove in detail, other aspects will be apparent to, and readily made by, those skilled in the art without departing from the scope and spirit of the invention. Accordingly, the foregoing description is intended to be illustrative rather than restrictive. The invention described hereinabove is defined by the appended claims and all changes to the invention that fall within the meaning and the range of the equivalency of the claims are to be embraced within their scope.

The invention claimed is:

1. A piston cylinder arrangement for an air compressor, comprising:
   a cylinder;
   a connecting rod having a wrist pin receiving end;
   a hollow cylindrical wrist pin provided in the wrist pin receiving end of the connecting rod; and
   a piston provided on the connecting rod via the wrist pin and positioned within the cylinder,
   wherein at least one passageway is defined in a cylindrical wall of the wrist pin to permit air to flow into the wrist pin from the cylinder.

2. The piston cylinder arrangement as claimed in claim 1, wherein the at least one passageway permits a bi-directional flow of the air into and out of the wrist pin.

3. The piston cylinder arrangement as claimed in claim 1, wherein the at least one passageway defined in the wrist pin comprises two inlet passageways, and
   wherein one inlet passageway is provided on a first side of the wrist pin receiving end of the connecting rod, and one inlet passageway is provided on a second side of the wrist pin receiving end of the connecting rod.

4. A piston cylinder arrangement for an air compressor, comprising:
   a cylinder;
   a connecting rod having a wrist pin receiving end;
   a wrist pin provided in the wrist pin receiving end of the connecting rod; and
   a piston provided on the connecting rod via the wrist pin and positioned within the cylinder,
   wherein at least one passageway is defined in the wrist pin to permit air to flow into the wrist pin from the cylinder, and
   wherein at least one outlet passageway is defined in the piston to permit the air to flow out of the wrist pin through the piston.

5. The piston cylinder arrangement as claimed in claim 4, wherein the at least one outlet passageway defined in the piston is provided beneath the wrist pin.

6. The piston cylinder arrangement as claimed in claim 4, wherein the at least one outlet passageway defined in the piston is inclined relative to the wrist pin.

7. The piston cylinder arrangement as claimed in claim 1, wherein the at least one passageway defined in the wrist pin comprises an inlet passageway and an outlet passageway, and
   wherein the outlet passageway is provided in an upper surface of the cylindrical wall of the wrist pin, and the inlet passageway is provided in a lower surface of the cylindrical wall of the wrist pin.

8. The piston cylinder arrangement as claimed in claim 1, wherein the wrist pin is held within two opposing recesses defined by the piston.

9. The piston cylinder arrangement as claimed in claim 1, further comprising a wrist pin bearing provided in the wrist pin receiving end of the connecting rod, and
   wherein the wrist pin bearing is positioned between the wrist pin and the connecting rod.

10. An air compressor for a rail vehicle, comprising:
   a compressor housing;
   a crankshaft assembly supported by the compressor housing; and
   at least one piston cylinder supported in the compressor housing, the at least one piston cylinder comprising:
      a cylinder;
      a connecting rod having a wrist pin receiving end, the connecting rod linked to the crankshaft assembly;
      a hollow cylindrical wrist pin provided in the wrist pin receiving end of the connecting rod; and a piston provided on the connecting rod via the wrist pin and provided within the cylinder,
   wherein at least one passageway is defined in a cylindrical wall of the wrist pin to permit air to flow into the wrist pin from the cylinder.

11. The air compressor as claimed in claim 10, wherein the at least one passageway permits a bi-directional flow of the air into and out of the wrist pin.

12. The air compressor as claimed in claim 10, wherein the at least one passageway defined in the wrist pin comprises two inlet passageways, and
   wherein one inlet passageway is provided on a first side of the wrist pin receiving end of the connecting rod, and one inlet passageway is provided on a second side of the wrist pin receiving end of the connecting rod.

13. An air compressor for a rail vehicle, comprising:
   a compressor housing;
   a crankshaft assembly supported by the compressor housing; and
   at least one piston cylinder supported in the compressor housing, the at least one piston cylinder comprising:
      a cylinder;
      a connecting rod having a wrist pin receiving end, the connecting rod linked to the crankshaft assembly;
      a wrist pin provided in the wrist pin receiving end of the connecting rod; and a piston provided on the connecting rod via the wrist pin and provided within the cylinder,
   wherein at least one passageway is defined in the wrist pin to permit air to flow into the wrist pin from the cylinder, and
   wherein at least one outlet passageway is defined in the piston to permit the air to flow out of the wrist pin through the piston.

14. The piston cylinder arrangement as claimed in claim 13, wherein the at least one outlet passageway defined in the piston is provided beneath the wrist pin.

15. The piston cylinder arrangement as claimed in claim 13, wherein the at least one outlet passageway defined in the piston is inclined relative to the wrist pin.

16. The piston cylinder arrangement as claimed in claim 10, wherein the at least one passageway defined in the wrist pin comprises an inlet passageway and an outlet passageway, and
   wherein the outlet passageway is provided in an upper surface of the cylindrical wall of the wrist pin, and the inlet passageway is provided in a lower surface of the cylindrical wall of the wrist pin.

17. The piston cylinder arrangement as claimed in claim 10, wherein the wrist pin is held within two opposing recesses defined by the piston.

18. The piston cylinder arrangement as claimed in claim 10, further comprising a wrist pin bearing provided in the wrist pin receiving end of the connecting rod, and
   wherein the wrist pin bearing is positioned between the wrist pin and the connecting rod.

19. A method of cooling a wrist pin in a piston cylinder of an air compressor, comprising:
   directing air from a compressor housing of the air compressor into the piston cylinder;
   directing the air from the piston cylinder into the wrist pin provided on a connecting rod in the piston cylinder;
   directing the air through the wrist pin; and
   directing the air back into the compressor housing through the wrist pin.

20. The method of cooling the wrist pin as claimed in claim 19, further comprising directing the air out of the wrist pin through a piston provided on the wrist pin.

* * * * *